(12) United States Patent
Higashide et al.

(10) Patent No.: US 12,190,268 B2
(45) Date of Patent: Jan. 7, 2025

(54) OPERATION MANAGEMENT APPARATUS, SYSTEM, OPERATION MANAGEMENT METHOD, AND NON-TRANSITORY COMPUTER READABLE MEDIUM

(71) Applicant: TOYOTA JIDOSHA KABUSHIKI KAISHA, Toyota (JP)

(72) Inventors: Hiroshi Higashide, Nagoya (JP); Keiichi Uno, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 17/504,236

(22) Filed: Oct. 18, 2021

(65) Prior Publication Data

US 2022/0122013 A1 Apr. 21, 2022

(30) Foreign Application Priority Data

Oct. 21, 2020 (JP) .................................. 2020-176932

(51) Int. Cl.
*G06Q 10/0631* (2023.01)

(52) U.S. Cl.
CPC . *G06Q 10/06314* (2013.01); *G06Q 10/06312* (2013.01)

(58) Field of Classification Search
CPC .... G06Q 50/30; G06Q 10/0631; G06Q 10/08; G06Q 10/08355
See application file for complete search history.

(56) References Cited

U.S. PATENT DOCUMENTS

2002/0026281 A1* 2/2002 Shibata .................. G08G 1/123
340/995.1
2021/0312367 A1* 10/2021 Higashide ........ G06Q 10/06312

FOREIGN PATENT DOCUMENTS

| CN | 109300326 A | 2/2019 |
| JP | H06-004798 A | 1/1994 |
| JP | H07110898 A | 4/1995 |
| JP | 2014203124 A | 10/2014 |
| JP | 2018106745 A | 7/2018 |

\* cited by examiner

*Primary Examiner* — Johnna R Loftis
(74) *Attorney, Agent, or Firm* — Oliff PLC (57) ABSTRACT

An operation management apparatus includes a controller configured to repeatedly determine a delay relative to a standard schedule, with respect to a vehicle operated in accordance with the schedule, the controller suspending determination of the delay for a certain period of time in a case in which the schedule is adjusted according to a result of determination of the delay.

20 Claims, 7 Drawing Sheets

OPERATION MANAGEMENT APPARATUS, SYSTEM, OPERATION MANAGEMENT METHOD, AND NON-TRANSITORY COMPUTER READABLE MEDIUM

CROSS-REFERENCE TO RELATED APPLICATION

This application claims priority to Japanese Patent Application No. 2020-176932, filed on Oct. 21, 2020, the entire contents of which are incorporated herein by reference.

TECHNICAL FIELD

The present disclosure relates to an operation management apparatus, a system, an operation management method, and a program.

BACKGROUND

Patent Literature (PTL) 1 discloses technology for determining whether the delay time of a bus is within an allowable range, and for creating an operation improvement plan if the delay time is outside the allowable range.

CITATION LIST

Patent Literature

PTL 1: JP H06-004798 A

SUMMARY

It takes some period of time after the implementation of operational improvements for the delay time to return to within the allowable range. During that period of time, there is little need to determine again whether the delay time is within the allowable range.

It would be helpful to avoid an unnecessary delay determination after operation schedule adjustment.

An operation management apparatus according to the present disclosure includes a controller configured to repeatedly determine a delay relative to a schedule serving as a basis, with respect to a vehicle operated in accordance with the schedule, the controller suspending determination of the delay for a certain period of time in a case in which the schedule is adjusted according to a result of determination of the delay.

An operation management method according to the present disclosure is an operation management method including repeatedly determining, by an operation management apparatus, a delay relative to a schedule serving as a basis, with respect to a vehicle operated in accordance with the schedule, the determining of the delay being suspended for a certain period of time in a case in which the schedule is adjusted according to a result of determination of the delay.

A program according to the present disclosure is a program configured to cause a computer to execute operations, the operations including repeatedly determining a delay relative to a schedule serving as a basis, with respect to a vehicle operated in accordance with the schedule, the determining of the delay being suspended for a certain period of time in a case in which the schedule is adjusted according to a result of determination of the delay.

According to the present disclosure, an unnecessary delay determination after operation schedule adjustment can be avoided.

DETAILED DESCRIPTION

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

Figure 1:
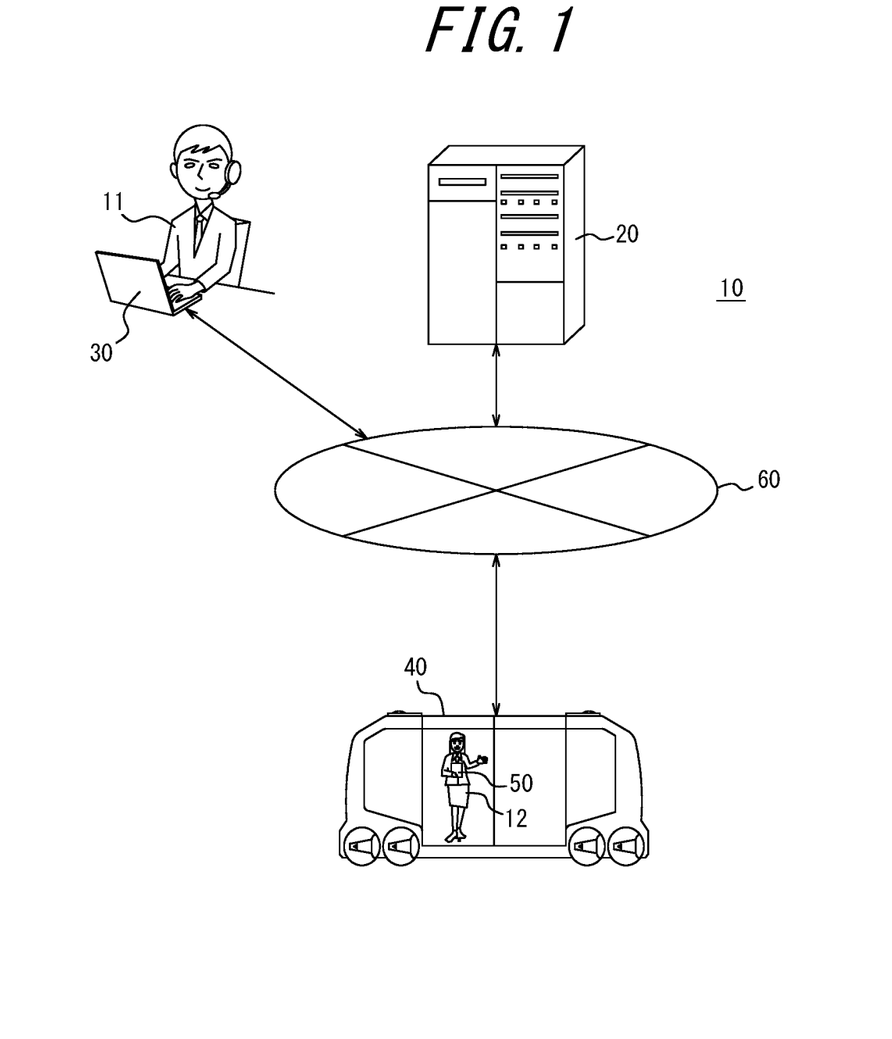
FIG. 1 is a diagram illustrating a configuration of a system according to an embodiment of the present disclosure.

A configuration of a system 10 according to the present embodiment will be described with reference to FIG. 1.

The system 10 includes at least one operation management apparatus 20, at least one first terminal apparatus 30, at least one vehicle 40, and at least one second terminal apparatus 50. The operation management apparatus 20 can communicate with the first terminal apparatus 30, the vehicle 40, and the second terminal apparatus 50 via a network 60. The first terminal apparatus 30 may be able to communicate with the vehicle 40 and the second terminal apparatus 50. The vehicle 40 may be able to communicate with the second terminal apparatus 50.

The operation management apparatus 20 is installed in a facility such as a data center. The operation management apparatus 20 is a computer such as a server that belongs to a cloud computing system or another type of computing system.

The first terminal apparatus 30 is installed in an operation management room and is used by a manager 11 who manages the operation of the vehicle 40. The first terminal apparatus 30 is, for example, a general purpose device such as a PC, or a dedicated device. The term "PC" is an abbreviation of personal computer.

The vehicle 40 is operated in accordance with a schedule serving as a basis. A schedule is a plan that specifies when and where the vehicle 40 should be located. The "where" includes, for example, the point from which the vehicle 40 is to depart, the points at which the vehicle 40 is to stop for passengers to board or alight, or the point at which the vehicle 40 is to ultimately arrive. The "when" includes, for example, the time corresponding to each point, that is, the time at which the vehicle 40 is to depart, the times at which the vehicle 40 is to stop for passengers to board or alight, or the time at which the vehicle 40 is to ultimately arrive. In the schedule, the stop duration for the vehicle 40 may be specified for each point at which the vehicle 40 is to stop.

The vehicle 40 is, for example, any type of automobile such as a gasoline vehicle, a diesel vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. The vehicle 40, which is an AV in the present embodiment, may be driven by a driver, or the driving may be automated at any level. The term "AV" is an abbreviation of autonomous vehicle. The automation level is, for example, any one of Level 1 to Level 5 according to the level classification defined by SAE. The name "SAE" is an abbreviation of Society of Automotive Engineers. The vehicle 40 may be a MaaS-dedicated vehicle. The term "MaaS" is an abbreviation of Mobility as a Service.

The second terminal apparatus 50 is held by a crew member 12 who assists in the operation of the vehicle 40, and used by the crew member 12. The second terminal apparatus 50 is, for example, a mobile device such as a mobile phone, a smartphone, or a tablet.

The network 60 includes the Internet, at least one WAN, at least one MAN, or any combination thereof. The term "WAN" is an abbreviation of wide area network. The term "MAN" is an abbreviation of metropolitan area network. The network 60 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

As a variation of the present embodiment, the first terminal apparatus 30 may be held by the manager 11 instead of being installed in the operation management room. In such a variation, the first terminal apparatus 30 is, for example, a mobile device such as a mobile phone, a smartphone, or a tablet.

As a variation of the present embodiment, the second terminal apparatus 50 may be mounted in the vehicle 40 instead of being held by the crew member 12. In such a variation, the second terminal apparatus 50 is, for example, a car navigation device or a dedicated device.

An outline of the present embodiment will be described with reference to FIG. 1.

The operation management apparatus 20 repeatedly determines a delay relative to a schedule serving as a basis, with respect to a vehicle 40 operated in accordance with the schedule. The operation management apparatus 20 suspends determination of the delay for a certain period of time in a case in which the schedule is adjusted according to a result of determination of the delay. A period of time for which determination of the delay is suspended will be referred to as a "suspension period".

According to the present embodiment, an unnecessary delay determination after operation schedule adjustment can be avoided.

Figure 2:
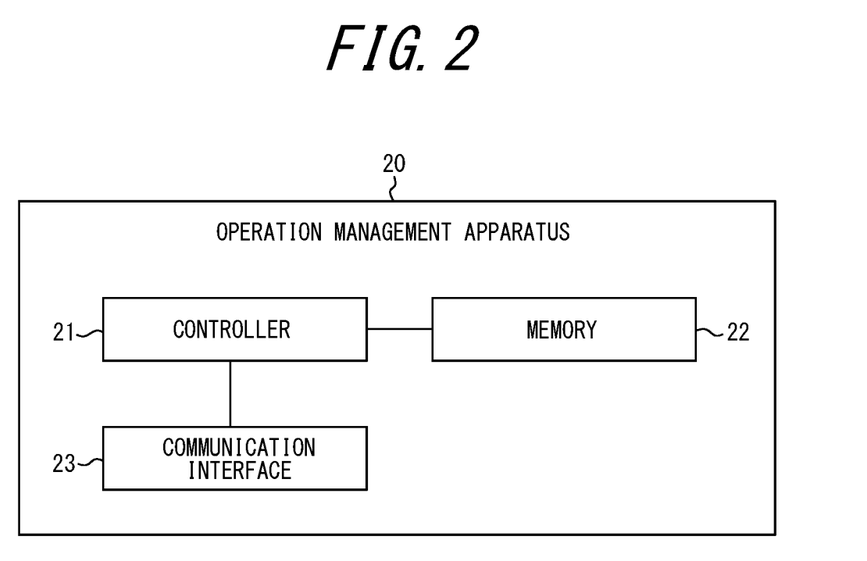
FIG. 2 is a block diagram illustrating a configuration of an operation management apparatus according to the embodiment of the present disclosure.

A configuration of the operation management apparatus 20 according to the present embodiment will be described with reference to FIG. 2.

The operation management apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the operation management apparatus 20 while controlling components of the operation management apparatus 20.

The memory 22 includes at least one semiconductor memory, at least one magnetic memory, at least one optical memory, or any combination thereof. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the operation management apparatus 20 and data obtained by the operations of the operation management apparatus 20.

The communication interface 23 includes at least one interface for communication. The interface for communication is, for example, a LAN interface. The communication interface 23 receives data to be used for the operations of the operation management apparatus 20, and transmits data obtained by the operations of the operation management apparatus 20.

The functions of the operation management apparatus 20 are realized by execution of a program according to the present embodiment by a processor serving as the controller 21. That is, the functions of the operation management apparatus 20 are realized by software. The program causes a computer to execute the operations of the operation management apparatus 20, thereby causing the computer to function as the operation management apparatus 20. That is, the computer executes the operations of the operation management apparatus 20 in accordance with the program to thereby function as the operation management apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the operation management apparatus 20 may be realized by a programmable circuit or a dedicated circuit serving as the controller 21. That is, some or all of the functions of the operation management apparatus 20 may be realized by hardware.

Figure 3:
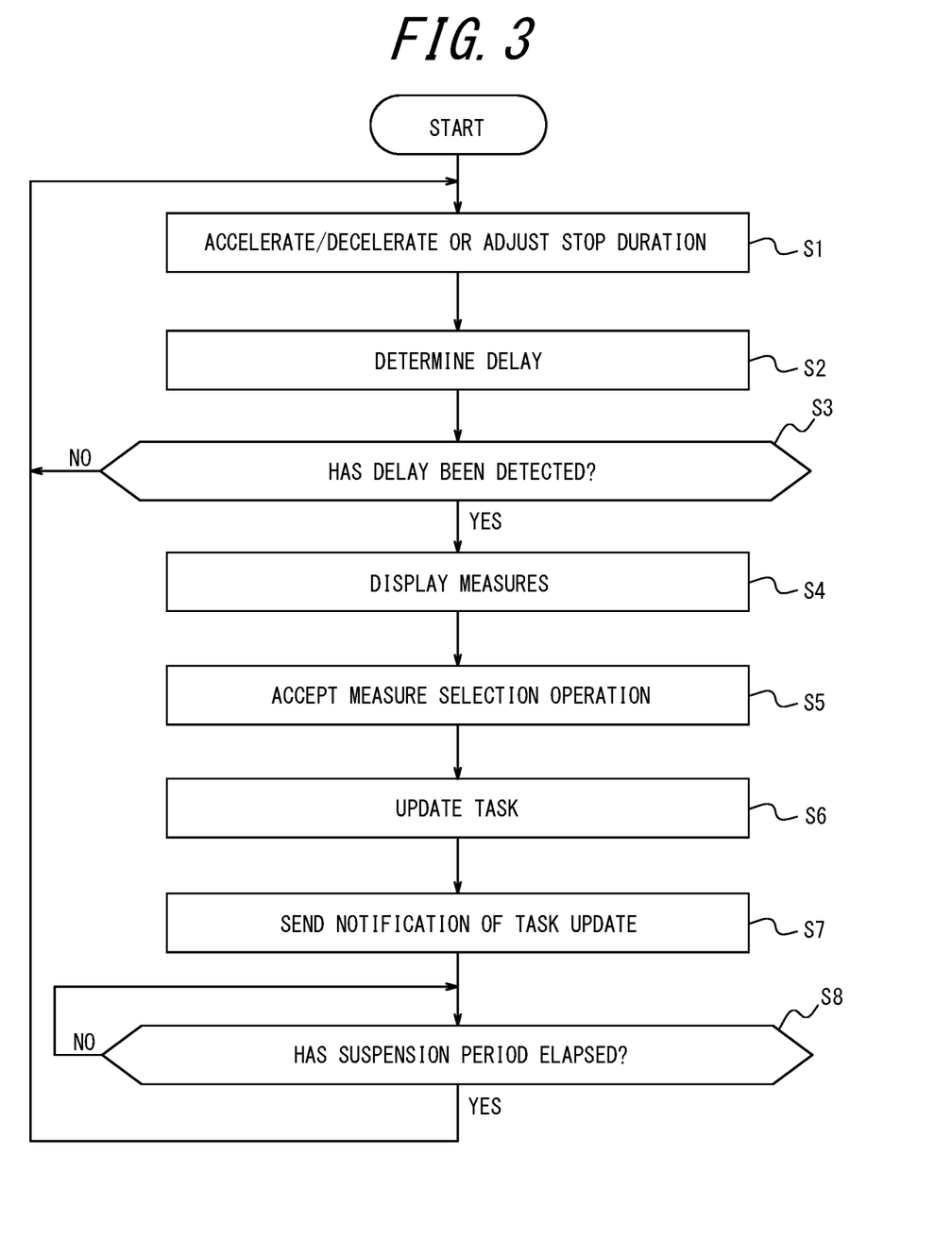
FIG. 3 is a flowchart illustrating operations of the system according to the embodiment of the present disclosure.

Operations of the system 10 according to the present embodiment will be described with reference to FIG. 3. These operations correspond to an operation management method according to the present embodiment.

A vehicle 40 is operated in accordance with a schedule serving as a basis. Assuming that there is no delay, the vehicle 40 departs from the point specified in the schedule at the time specified in the schedule. The vehicle 40 stops at the points specified in the schedule for passengers to board or alight at the times specified in the schedule. The vehicle 40 ultimately arrives at the point specified in the schedule at the time specified in the schedule. The schedule is given to the vehicle 40 in advance as a "task".

In step S1, the vehicle 40 accelerates/decelerates or adjusts the stop duration as necessary. This process may be executed in any procedure, but in the present embodiment, is executed in the following procedure.

The vehicle 40 measures the position of the vehicle 40 using a GNSS receiver. The term "GNSS" is an abbreviation of global navigation satellite system. GNSS is, for example, GPS, QZSS, BDS, GLONASS, or Galileo. The term "GPS" is an abbreviation of Global Positioning System. The term "QZSS" is an abbreviation of Quasi-Zenith Satellite System. QZSS satellites are called quasi-zenith satellites. The term "BDS" is an abbreviation of BeiDou Navigation Satellite System. The term "GLONASS" is an abbreviation of Global Navigation Satellite System. The vehicle 40 calculates the difference between the time, as specified by the task, corresponding to the measured position and the current time. That is, the vehicle 40 calculates the difference yielded by subtracting the time at which the vehicle 40 should be located at its current location from the current time. The vehicle 40 accelerates/decelerates or adjusts the stop duration according to the calculated difference. That is, the vehicle 40 accelerates or reduces the stop duration in a case in which the difference is positive. The vehicle 40 decelerates or extends the stop duration in a case in which the difference is negative.

An upper limit is set on the speed of the vehicle 40, and acceleration beyond the upper limit is not performed. A lower limit is set on the stop duration for the vehicle 40, and reduction of the stop duration below the lower limit is not performed. Therefore, acceleration of the vehicle 40 and reduction of the stop duration for the vehicle 40 might not suffice to eliminate delays relative to the schedule.

In step S2, the controller 21 of the operation management apparatus 20 determines a delay relative to the schedule, with respect to the vehicle 40. This process may be executed in any procedure, but in the present embodiment, is executed in the following procedure.

The vehicle 40 transmits positional data indicating the position measured in step S1 to the operation management apparatus 20 via an interface compliant with a mobile communication standard such as LTE, the 4G standard, or the 5G standard. The term "LTE" is an abbreviation of Long Term Evolution. The term "4G" is an abbreviation of 4th generation. The term "5G" is an abbreviation of 5th generation.

The communication interface 23 of the operation management apparatus 20 receives the transmitted positional data from the vehicle 40. The controller 21 of the operation management apparatus 20 acquires the positional data received by the communication interface 23. The controller 21 calculates the difference between the time, as specified by the schedule, corresponding to the position indicated by the acquired positional data and the current time. That is, the controller 21 calculates the difference yielded by subtracting the time at which the vehicle 40 should be located at its current location from the current time. The controller 21 compares the calculated difference with a threshold Th. The threshold Th is set in advance but may be changed as appropriate.

In step S3, the controller 21 of the operation management apparatus 20 determines whether a delay large enough to require adjustment of the schedule has been detected as a result of the process in step S2. Specifically, the controller 21 determines that a large delay has been detected in a case in which the difference calculated in step S2 is equal to or greater than the threshold Th. The controller 21 determines that a large delay has not been detected in a case in which the difference is less than the threshold Th. In a case in which a large delay has been detected, the process in step S4 is executed. In a case in which a large delay has not been detected, the processes in step S1 onwards are executed again.

In step S4, the controller 21 of the operation management apparatus 20 notifies the manager 11 of the result of the determination of the delay, and controls the first terminal apparatus 30 to display one or more measures. This process may be executed in any procedure, but in the present embodiment, is executed in the following procedure.

The controller 21 of the operation management apparatus 20 controls the communication interface 23 to transmit measure data indicating at least two measures, including a measure of delaying the schedule and a measure of introducing an additional vehicle. As the measure of delaying the schedule, two or more measures with different lengths of time to delay may be indicated separately. The communication interface 23 transmits the measure data to the first terminal apparatus 30.

The first terminal apparatus 30 receives the transmitted measure data from the operation management apparatus 20 via a LAN interface or an interface compliant with a mobile communication standard such as LTE, the 4G standard, or the 5G standard. The first terminal apparatus 30 displays the received measure data on a display such as an LCD or an organic EL display. The term "LCD" is an abbreviation of liquid crystal display. The term "EL" is an abbreviation of electro luminescence.

In step S5, the controller 21 of the operation management apparatus 20 controls the first terminal apparatus 30 to accept an operation to select one measure. This process may be executed in any procedure, but in the present embodiment, is executed in the following procedure.

The first terminal apparatus 30 accepts, from the manager 11, an operation to select one measure from among the measures indicated by the measure data via an interface such as a physical key, a capacitive key, a pointing device, a touch screen integrally provided with the display, or a microphone. The first terminal apparatus 30 transmits selection data indicating the selected measure to the operation management apparatus 20 via the LAN interface or the interface compliant with the mobile communication standard.

The communication interface 23 of the operation management apparatus 20 receives the transmitted selection data from the first terminal apparatus 30. The controller 21 of the operation management apparatus 20 acquires the selection data received by the communication interface 23.

In step S6, the controller 21 of the operation management apparatus 20 adjusts the schedule according to the measure selected by the manager 11. That is, the controller 21 updates the task. Specifically, in a case in which the measure of delaying the schedule is indicated by the selection data acquired in step S5, the controller 21 delays the schedule. In a case in which the measure of introducing an additional vehicle is indicated by the selection data, the controller 21 adjusts the schedule by changing the schedule to a schedule for operating a plurality of vehicles, including the vehicle 40 and the additional vehicle.

In step S7, the controller 21 of the operation management apparatus 20 notifies the vehicle 40 of the task update. This process may be executed in any procedure, but in the present embodiment, is executed in the following procedure.

The controller 21 of the operation management apparatus 20 controls the communication interface 23 to transmit update data indicating, as the updated task, the adjusted schedule obtained as a result of the process in step S6. The communication interface 23 transmits the update data to the vehicle 40.

The vehicle 40 receives the transmitted update data from the operation management apparatus 20 via the interface compliant with the mobile communication standard. The vehicle 40 recognizes the task indicated by the received update data as a newly given task.

As an additional procedure, the crew member 12 may be notified of the task update. In such a procedure, the vehicle 40 transmits the update data to the second terminal apparatus 50 via the interface compliant with the mobile communication standard or an interface compliant with a short-range wireless communication standard such as Bluetooth® (Bluetooth is a registered trademark in Japan, other countries, or both). The second terminal apparatus 50 receives the transmitted update data from the vehicle 40 via an interface compliant with the mobile communication standard or an interface compliant with the short-range wireless communication standard. The second terminal apparatus 50 displays the received update data on a display such as an LCD or an organic EL display.

In step S8, the controller 21 of the operation management apparatus 20 determines whether a suspension period has elapsed since completion of the process in step S2. In a case in which the suspension period has not elapsed, the process in step S8 is executed again. In a case in which the suspension period has elapsed, the processes in step S1 onwards are executed again.

The suspension period may be a fixed time period but is variable in the present embodiment. The suspension period may be set in any procedure, but in the present embodiment, is set in the following procedure.

The controller 21 of the operation management apparatus 20 estimates the length of time until a delay relative to the adjusted schedule obtained as a result of the process in step S6 is eliminated. The controller 21 sets the suspension period according to the estimated length of time.

Specifically, in a case in which the schedule is delayed in step S6, the controller 21 of the operation management apparatus 20 calculates the delay relative to the adjusted schedule by subtracting the time period for which the schedule has been delayed from the difference calculated in step S2. In a case in which the schedule is changed in step S6 to a schedule for operating a plurality of vehicles, including the vehicle 40 and the additional vehicle, the controller 21 calculates the difference between the time, as specified by the changed schedule, corresponding to the position that is indicated by the positional data acquired in step S2 and the current time, as the delay relative to the adjusted schedule. The controller 21 estimates the length of time required until the calculated delay is eliminated in a case in which the vehicle 40 accelerates, reduces the stop duration, or both. The controller 21 sets the period of time obtained by subtracting the threshold Th from the estimated length of time, or a longer period of time, as the suspension period.

A specific example of the operations of the system 10 according to the present embodiment will be described with reference to FIGS. 4 to 7.

Figure 4:
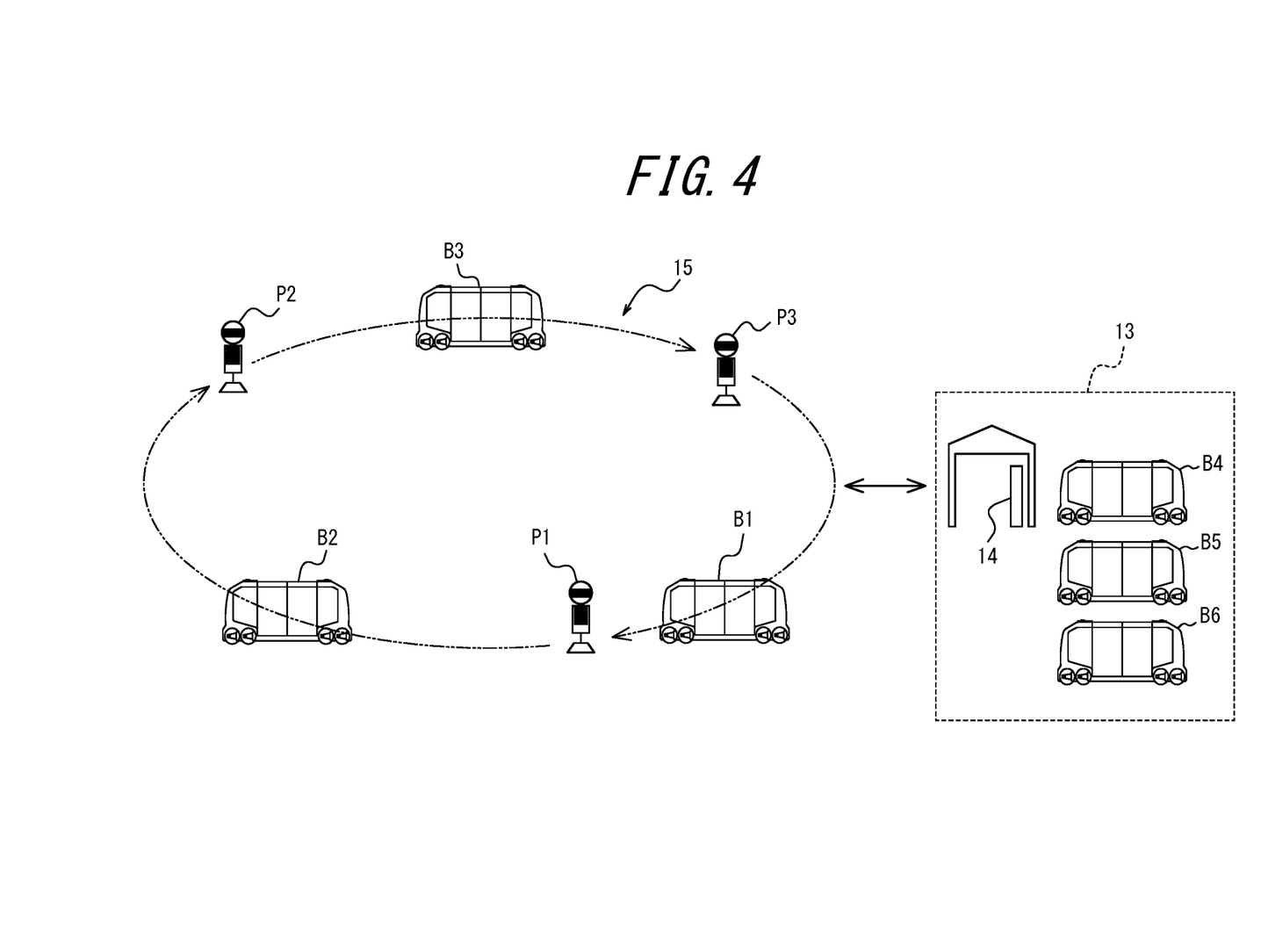
FIG. 4 is a diagram illustrating an example of a route traversed by vehicles according to the embodiment of the present disclosure.

As illustrated in FIG. 4, in this example, among six circulating buses each corresponding to a vehicle 40, three circulating buses circulate along a route 15, and the remaining three circulating buses are on standby at a garage 13. Each circulating bus is a BEV and is charged using a charging facility 14 in the garage 13 while on standby. Each circulating bus departs from the garage 13, stops at stops P1, P2, and P3 on the route 15 for passengers to board and alight, and ultimately arrives at the garage 13, in accordance with a given task.

Figure 5:
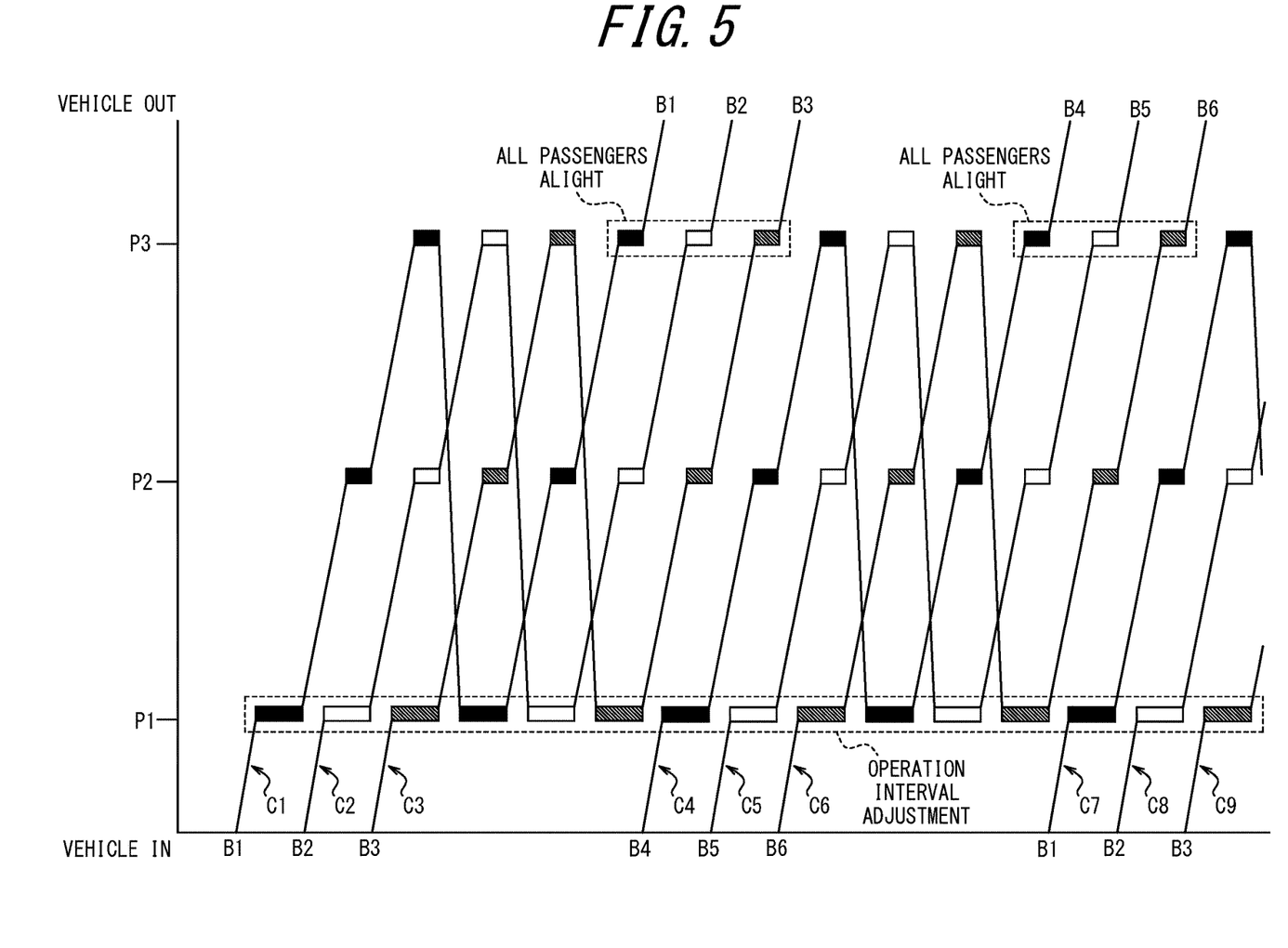
FIG. 5 is a diagram illustrating an example of a schedule serving as a basis for operating the vehicles according to the embodiment of the present disclosure.

As illustrated in FIG. 5, in this example, circulating buses B1, B2, and B3 leave the garage 13 in order in accordance with tasks C1, C2, and C3, respectively. The circulating buses B1, B2, and B3 each do two laps on the route 15 and return to the garage 13 in order. To replace the circulating buses B1, B2, and B3 upon their return to the garage 13, circulating buses B4, B5, and B6 leave the garage 13 in order in accordance with tasks C4, C5, and C6, respectively. The circulating buses B4, B5, and B6 each do two laps on the route 15 and return to the garage 13 in order. To replace the circulating buses B4, B5, and B6 upon their return to the garage 13, the circulating buses B1, B2, and B3 leave the garage 13 again in order in accordance with tasks C7, C8, and C9, respectively. Thereafter, operation of the circulating buses is repeated in the same manner.

Each task specifies what time the corresponding circulating bus should leave the garage 13, what time to arrive at the stops P1, P2, and P3, how many minutes to be stopped, and what time to return to the garage 13. The stop duration at the stop P1 is set to be longer than the stop duration at the stops P2 and P3 so as to be able to be reduced for operation interval adjustment. In this example, it is assumed that the stop duration at the stops P2 and P3 cannot be reduced. When each circulating bus stops at the stop P3 just before returning to the garage 13, all passengers must alight, and no one is allowed to board.

Figure 6:
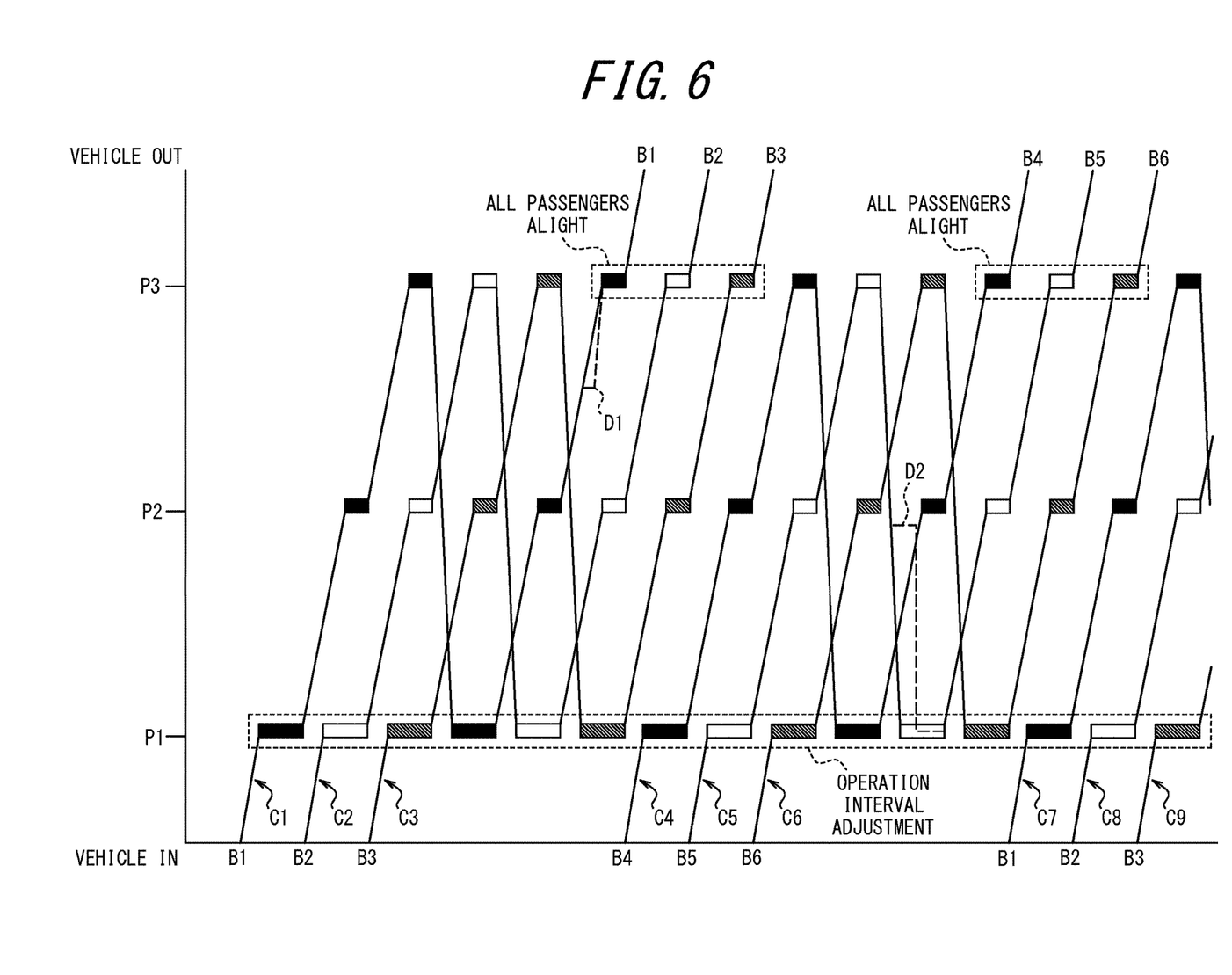
FIG. 6 is a diagram illustrating an example of delays relative to the schedule illustrated in FIG. 5 being eliminated.

As illustrated in FIG. 6, suppose that a delay D1 of less than the threshold Th occurs due to an event such as an emergency stop while the circulating bus B1 is traveling from the stop P2 to the stop P3 on the second lap.

In step S1, the circulating bus B1 measures the position of the circulating bus B1. The circulating bus B1 calculates the difference between the time, as specified by the task C1, corresponding to the measured position and the current time. The circulating bus B1 accelerates to the upper limit on the speed since the calculated difference is positive and the circulating bus B1 is traveling.

In step S2, the circulating bus B1 transmits positional data indicating the position measured in step S1 to the operation management apparatus 20. The controller 21 of the operation management apparatus 20 calculates the same difference as in step S1 using the transmitted positional data. The controller 21 compares the calculated difference with the threshold Th.

In step S3, the controller 21 of the operation management apparatus 20 determines that a large delay has not been detected since the difference calculated in step S2 is less than the threshold Th. The processes in step S1 onwards are then executed again.

As a result of the circulating bus B1 accelerating, the delay D1 is eliminated by the time the circulating bus B1 arrives at the stop P3.

As illustrated in FIG. 6, suppose that a delay D2 of less than the threshold Th occurs due to an event such as an emergency stop while the circulating bus B5 is traveling from the stop P3 to the stop P1.

In step S1, the circulating bus B5 measures the position of the circulating bus B5. The circulating bus B5 calculates the difference between the time, as specified by the task C5, corresponding to the measured position and the current time. The circulating bus B5 accelerates to the upper limit on the speed since the calculated difference is positive and the circulating bus B5 is traveling.

In step S2, the circulating bus B5 transmits positional data indicating the position measured in step S1 to the operation management apparatus 20. The controller 21 of the operation management apparatus 20 calculates the same difference as in step S1 using the transmitted positional data. The controller 21 compares the calculated difference with the threshold Th.

In step S3, the controller 21 of the operation management apparatus 20 determines that a large delay has not been detected since the difference calculated in step S2 is less than the threshold Th. The processes in step S1 onwards are then executed again.

As a result of the circulating bus B5 accelerating, the delay D2 is reduced but not yet eliminated at the time when the circulating bus B5 arrives at the stop P1.

In step S1, the circulating bus B5 measures the position of the circulating bus B5. The circulating bus B5 calculates the difference between the time, as specified by the task C5, corresponding to the measured position and the current time. The circulating bus B5 reduces the stop duration since the calculated difference is positive and the circulating bus B5 is stopped at the stop P1.

In step S2, the circulating bus B5 transmits positional data indicating the position measured in step S1 to the operation management apparatus 20. The controller 21 of the operation management apparatus 20 calculates the same difference as in step S1 using the transmitted positional data. The controller 21 compares the calculated difference with the threshold Th.

In step S3, the controller 21 of the operation management apparatus 20 determines that a large delay has not been detected since the difference calculated in step S2 is less than the threshold Th. The processes in step S1 onwards are then executed again.

As a result of the circulating bus B5 reducing the stop duration, the delay D2 is eliminated by the time the circulating bus B5 departs from the stop P1.

Figure 7:
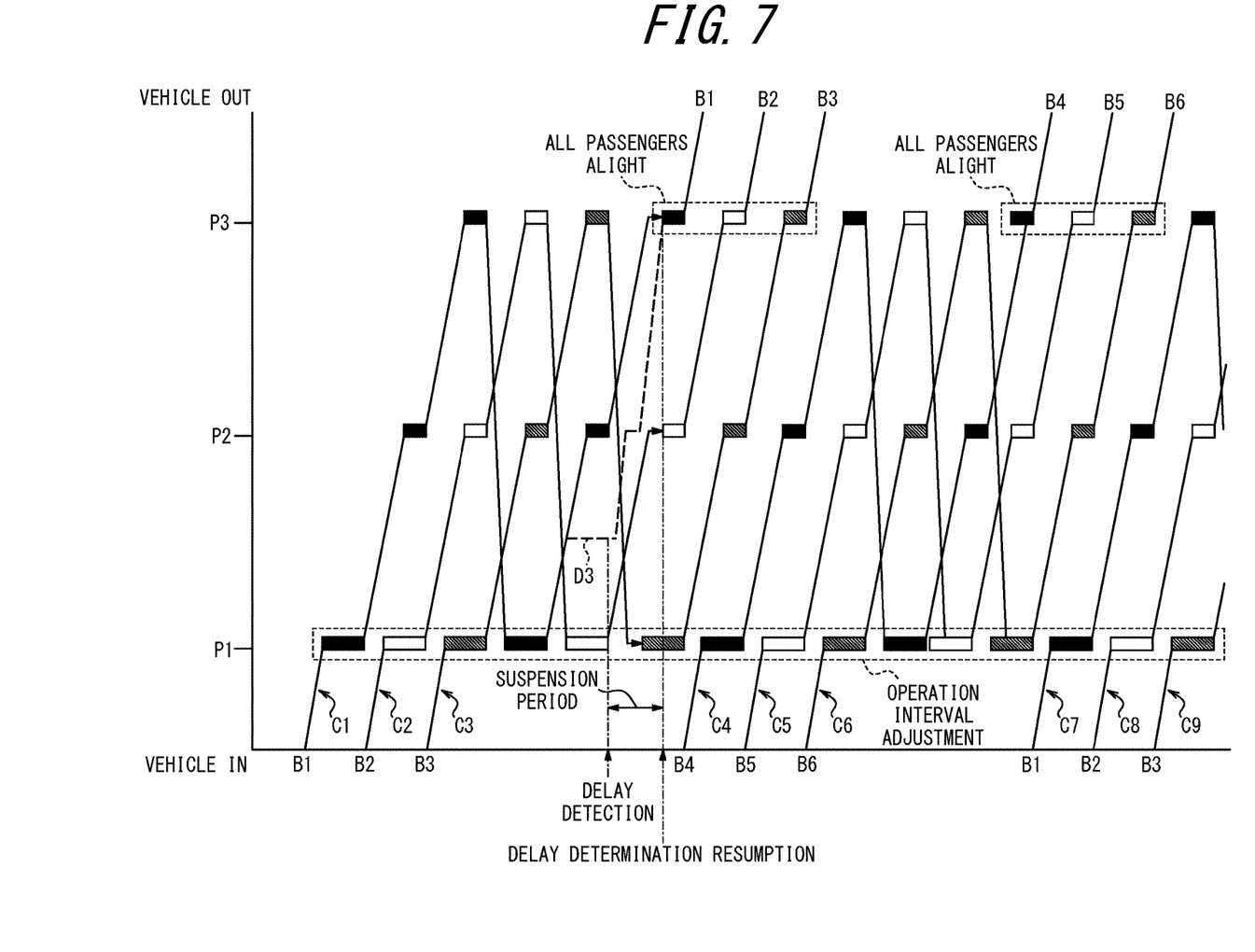
FIG. 7 is a diagram illustrating an example of the schedule illustrated in FIG. 5 being adjusted and a delay relative to the adjusted schedule being eliminated.

As illustrated in FIG. 7, suppose that a delay D3 equal to or greater than the threshold Th occurs due to an event such as an emergency stop while the circulating bus B1 is traveling from the stop P1 to the stop P2 on the second lap.

In step S1, the circulating bus B1 measures the position of the circulating bus B1. The circulating bus B1 calculates the difference between the time, as specified by the task C1, corresponding to the measured position and the current time. The circulating bus B1 accelerates to the upper limit on the speed since the calculated difference is positive and the circulating bus B1 is traveling.

In step S2, the circulating bus B1 transmits positional data indicating the position measured in step S1 to the operation management apparatus 20. The controller 21 of the operation management apparatus 20 calculates the same difference as in step S1 using the transmitted positional data. The controller 21 compares the calculated difference with the threshold Th.

In step S3, the controller 21 of the operation management apparatus 20 determines that a large delay has been detected since the difference calculated in step S2 is equal to or greater than the threshold Th.

In step S4, the controller 21 of the operation management apparatus 20 controls the communication interface 23 to transmit measure data indicating at least two measures, including a measure of delaying the schedule and a measure of introducing an additional vehicle. The first terminal apparatus 30 displays the transmitted measure data on the display.

In step S5, the first terminal apparatus 30 transmits selection data indicating a measure selected by the manager 11 to the operation management apparatus 20. In this example, suppose that the measure of delaying the schedule is selected. The controller 21 of the operation management apparatus 20 acquires the transmitted selection data.

In step S6, the controller 21 of the operation management apparatus 20 delays the respective unoperated portions of the tasks C1, C2, and C3, in operation, and delays the task C4 onwards, not in operation yet, since the measure of delaying the schedule is indicated by the selection data acquired in step S5. The length of time to delay is set according to the difference calculated in step S2.

In step S7, the controller 21 of the operation management apparatus 20 controls the communication interface 23 to transmit update data indicating the updated tasks obtained as a result of the process in step S6. Each vehicle 40 recognizes a corresponding task indicated by the transmitted update data as a newly given task.

In step S8, the controller 21 of the operation management apparatus 20 calculates the delay relative to the adjusted schedule by subtracting the time period for which the schedule is delayed in step S6 from the difference calculated in step S2. The controller 21 estimates the length of time required until the calculated delay is eliminated in a case in which the circulating bus B1 accelerates to the upper limit on the speed. The controller 21 sets the estimated length of time as the suspension period. When the suspension period elapses, the processes in step S1 onwards are executed again.

As a result of the schedule being adjusted and the circulating bus B1 accelerating, the delay D3 is eliminated by the time the circulating bus B1 arrives at the stop P1. In this example, delay determination is suspended after the delay D3 is detected until the delay D3 is eliminated.

As described above, in the present embodiment, the controller 21 of the operation management apparatus 20 repeatedly determines a delay relative to a schedule serving as a basis, with respect to a vehicle 40 operated in accordance with the schedule. The controller 21 suspends determination of the delay for a suspension period in a case in which the schedule is adjusted according to a result of determination of the delay.

According to the present embodiment, an unnecessary delay determination after operation schedule adjustment can be avoided.

In the present embodiment, the controller 21 of the operation management apparatus 20 notifies the manager 11 of a result of determination of the delay each time the delay is determined. The controller 21 suspends determination of the delay for the suspension period in a case in which an operation to adjust the schedule is performed by the manager 11. In a case in which an operation to introduce an additional vehicle is performed by the manager 11, the controller 21 adjusts the schedule by changing the schedule to a schedule for operating a plurality of vehicles, including the vehicle 40 and the additional vehicle, and suspends determination of the delay for the suspension period. The additional vehicle is, for example, selected from among the circulating buses on standby in the garage 13 illustrated in FIG. 4 and is introduced.

As a variation of the present embodiment, the decision of whether to adjust the schedule may be entrusted to the operation management apparatus 20 instead of the manager 11. That is, the controller 21 of the operation management apparatus 20 may determine whether to adjust the schedule according to a result of determination of the delay each time the delay is determined. In this variation, the controller 21 suspends determination of the delay for the suspension period in a case in which the schedule is adjusted.

As a variation of the present embodiment, the controller 21 of the operation management apparatus 20 may predict the demand for the vehicle 40, and adjust the suspension period according to the predicted demand. As the method for predicting the demand, any method may be used, but in this variation, a method is used in which the demand is predicted according to a result of observation by a sensor installed on a route 15 traversed by the vehicle 40. Specifically, a method is used in which images captured by one or more cameras serving as the sensor is analyzed to predict the demand. A corresponding one of the cameras is installed, for example, at each of the stops P1, P2, and P3 illustrated in FIG. 4, and observes how many passengers are waiting for a circulating bus. The suspension period is adjusted to be longer as the demand increases, but an upper limit is preferably set in advance on the suspension period.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

The invention claimed is:

1. An autonomous vehicle control system comprising:
a vehicle operated in accordance with a schedule, the schedule serving as a basis for operating the vehicle, and the vehicle being an autonomous vehicle that is operated without a driver in accordance with the schedule; and
an operation management apparatus comprising:
a communication interface configured to communicate with the vehicle; and
a controller configured to:
repeatedly determine a delay relative to the schedule;
suspend determination of the delay for a certain period of time in a case in which the schedule is adjusted according to a result of determination of the delay;
estimate, in a case in which the schedule is adjusted according to the result of determination of the delay, a length of time until a delay relative to an adjusted schedule is eliminated, and set the period of time according to the estimated length of time; and
when the schedule is adjusted, cause the communication interface to transmit, to the vehicle, update data indicating the adjusted schedule, wherein
the schedule and the adjusted schedule specify points (i) from which the vehicle is to depart, (ii) at which the vehicle is to stop for passengers to board or alight, and (iii) at which the vehicle is to ultimately arrive, as well as a time corresponding to each of the points,
the vehicle is configured to, upon receipt of the update data from the communication interface, autonomously travel and stop in accordance with the adjusted schedule indicated by the update data, and
the vehicle is configured to, while operating according to the schedule or the adjusted schedule, (1) repeatedly measure a current position of the vehicle using a global navigation satellite system receiver, (2) calculate a difference between a current time and a time specified by the schedule or the adjusted schedule corresponding to the current position of the vehicle that has been measured, and (3) autonomously, according to the difference that has been calculated, accelerate or decelerate the vehicle when the vehicle is traveling and adjust a stop duration of the vehicle when the vehicle is stopped at one of the points.

2. The autonomous vehicle control system of claim 1, wherein the controller is configured to:
notify a manager of a result of determination of the delay each time the delay is determined; and
suspend determination of the delay for the period of time in a case in which an operation to adjust the schedule is performed by the manager.

3. The autonomous vehicle control system of claim 1, wherein the controller is configured to:
notify a manager of a result of determination of the delay each time the delay is determined;
adjust, in a case in which an operation to introduce an additional vehicle is performed by the manager, the schedule by changing the schedule to a schedule for operating a plurality of vehicles, including the vehicle and the additional vehicle; and
suspend determination of the delay for the period of time.

4. The autonomous vehicle control system of claim 1, wherein the controller is configured to:
determine whether to adjust the schedule according to a result of determination of the delay each time the delay is determined; and
suspend determination of the delay for the period of time in a case in which the schedule is adjusted.

5. The autonomous vehicle control system of claim 1, wherein the controller is configured to:
predict a demand for the vehicle, and adjust the period of time according to the predicted demand.

6. The autonomous vehicle control system of claim 5, wherein the controller is configured to:
predict the demand according to a result of observation by a sensor installed on a route traversed by the vehicle.

7. The autonomous vehicle control system of claim 6, wherein
the sensor is a camera, and
the controller is configured to analyze an image captured by the camera to predict the demand.

8. The autonomous vehicle control system of claim 1, wherein the vehicle is a circulating bus.

9. The autonomous vehicle control system according to claim 1, further comprising:
a sensor installed on a route traversed by the vehicle, wherein the controller is configured to:
predict a demand for the vehicle according to a result of observation by the sensor; and
adjust the period of time according to the predicted demand.

10. The autonomous vehicle control system according to claim 1, wherein the communication interface is configured to:
wirelessly communicate with the vehicle; and
when the schedule is adjusted, wirelessly transmit the update data to the vehicle.

11. The autonomous vehicle control system according to claim 1, wherein
the vehicle is configured to transmit the current position of the vehicle that has been measured to the operation management apparatus, via the communication interface, and the controller of the operation management apparatus determines the delay based on the current position of the vehicle that has been transmitted from the vehicle.

12. An autonomous vehicle control system comprising:
a vehicle operated in accordance with a schedule, the schedule serving as a basis for operating the vehicle, and the vehicle being an autonomous vehicle that is operated without a driver in accordance with the schedule; and
an operation management apparatus comprising:
a communication interface configured to communicate with the vehicle; and
a controller configured to:
repeatedly determine a delay relative to the schedule;
suspend determination of the delay for a certain period of time, which is a fixed time period, in a case in which the schedule is adjusted according to a result of determination of the delay; and
when the schedule is adjusted, cause the communication interface to transmit, to the vehicle, update data indicating the adjusted schedule, wherein
the schedule and the adjusted schedule specify points (i) from which the vehicle is to depart, (ii) at which the vehicle is to stop for passengers to board or alight, and (iii) at which the vehicle is to ultimately arrive, as well as a time corresponding to each of the points,
the vehicle is configured to, upon receipt of the update data from the communication interface, autonomously travel and stop in accordance with the adjusted schedule indicated by the update data, and
the vehicle is configured to, while operating according to the schedule or the adjusted schedule, (1) repeatedly measure a current position of the vehicle using a global navigation satellite system receiver, (2) calculate a difference between a current time and a time specified by the schedule or the adjusted schedule corresponding to the current position of the vehicle that has been measured, and (3) autonomously, according to the difference that has been calculated, accelerate or decelerate the vehicle when the vehicle is traveling and adjust a stop duration of the vehicle when the vehicle is stopped at one of the points.

13. The autonomous vehicle control system according to claim 12, wherein the communication interface is configured to:
wirelessly communicate with the vehicle; and
when the schedule is adjusted, wirelessly transmit the update data to the vehicle.

14. An autonomous vehicle control method implemented in a system that includes a vehicle and an operation management apparatus, the operation management apparatus comprising a communication interface, and a controller, the method comprising:
communicating, by the communication interface, with the vehicle, the vehicle being an autonomous vehicle that is operated without a driver in accordance with a schedule, the schedule serving as a basis for operating the vehicle;
repeatedly determining, by the controller of the operation management apparatus, a delay relative to the schedule;
the controller of the operation management apparatus suspending determination of the delay for a certain period of time in a case in which the schedule is adjusted according to a result of determination of the delay;
the controller of the operation management apparatus estimating, in a case in which the schedule is adjusted according to the result of determination of the delay, a length of time until a delay relative to an adjusted schedule is eliminated, and setting the period of time according to the estimated length of time; and
when the schedule is adjusted, the controller of the operation management apparatus transmitting, via the communication interface of the operation management apparatus to the vehicle, update data indicating the adjusted schedule, wherein
the schedule and the adjusted schedule specify points (i) from which the vehicle is to depart, (ii) at which the vehicle is to stop for passengers to board or alight, and (iii) at which the vehicle is to ultimately arrive, as well as a time corresponding to each of the points,
the vehicle, upon receipt of the update data from the communication interface, autonomously travels and stops in accordance with the adjusted schedule indicated by the update data, and
the vehicle, while operating according to the schedule or the adjusted schedule, (1) repeatedly measures a current position of the vehicle using a global navigation satellite system receiver, (2) calculates a difference between a current time and a time specified by the schedule or the adjusted schedule corresponding to the current position of the vehicle that has been measured, and (3) autonomously, according to the difference that has been calculated, accelerates or decelerates the vehicle when the vehicle is traveling and adjusts a stop duration of the vehicle when the vehicle is stopped at one of the points.

15. The autonomous vehicle control method of claim 14, further comprising:

notifying, via the communication interface of the operation management apparatus, a manager of a result of determination of the delay each time the determining of the delay is performed; and the controller of the operation management apparatus suspending the determination of the delay for the period of time in a case in which an operation to adjust the schedule is performed by the manager.

16. The autonomous vehicle control method of claim 14, further comprising:

notifying, via the communication interface of the operation management apparatus, a manager of a result of determination of the delay each time the determining of the delay is performed; and the controller of the operation management apparatus adjusting, in a case in which an operation to introduce an additional vehicle is performed by the manager, the schedule by changing the schedule to a schedule for operating a plurality of vehicles, including the vehicle and the additional vehicle.

17. The autonomous vehicle control method of claim 14, further comprising:

the controller of the operation management apparatus determining whether to adjust the schedule according to a result of determination of the delay each time the determining of the delay is performed.

18. The autonomous vehicle control method of claim 14, further comprising:

the controller of the operation management apparatus predicting a demand for the vehicle; and the controller of the operation management apparatus adjusting the period of time according to the predicted demand.

19. The autonomous vehicle control method of claim 18, wherein the predicting of the demand includes predicting the demand according to a result of observation by a sensor installed on a route traversed by the vehicle.

20. The autonomous vehicle control method according to claim 14, wherein the communication interface wirelessly communicates with the vehicle, and when the schedule is adjusted, the communication interface wirelessly transmits the update data to the vehicle.

* * * * *